March 24, 1953 C. OFFUTT 2,632,650

SPINDLE MOUNTED SPEED CONTROL UNIT FOR RECORD PLAYERS

Filed Feb. 3, 1949

INVENTOR.
CLAGGETT OFFUTT,
BY [signature]
ATTORNEY.

Patented Mar. 24, 1953 2,632,650

UNITED STATES PATENT OFFICE 2,632,650

SPINDLE MOUNTED SPEED CONTROL UNIT FOR RECORD PLAYERS

Claggett Offutt, Los Angeles, Calif.

Application February 3, 1949, Serial No. 74,431

1 Claim. (Cl. 274—1)

This invention relates to a unit mounted in the spindle of a record player whereby the speed of the turntable of the record player may be varied to suit the speed requirements of different types of records.

An object of my invention is to provide a novel spindle mounted unit which, when engaged by a particular record, will automatically vary the speed of the turntable to suit the requirements of the particular record which is being inserted on the spindle.

A feature of my invention is to provide a novel spindle mounted unit, including a trigger, the trigger, when engaged by a particular record, operating a switch, which, in turn, controls the speed of the turntable of the record player.

Still another feature of my invention is to provide a novel spindle mounted speed control unit, including an angularly shaped spindle and a central opening in the record, conforming in shape to the cross-section of the spindle, and the trip finger on the spindle being so positioned that the record with a particular angular shaped central opening will be the only one to trip this finger.

Still another feature of my invention is to provide a novel speed control unit for record players of the character stated, which will accommodate records of different types and will trip the control unit in a manner required for the particular speed of the record which is being played.

Other objects, advantages and features of invention may appear from the accompanying drawing, the subjoined detailed description and the appended claim.

In the drawing

Figure 2:
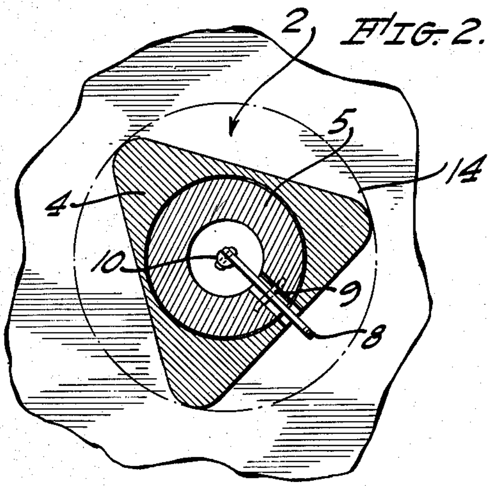
Figure 2 is an enlarged sectional view taken on line 2—2 of Figure 1.

Referring more particularly to the drawing, the numeral 1 indicates a turntable which is driven in the usual and well known manner and which has more than one speed, as will be evident in the subsequent description. The means to drive the turntable 1 is not shown, however, this is usual and well known in the art, and multi-speed drives are well known.

A spindle 2 rises from the center of the turntable 1 and is suitably supported by the bearing 3. The spindle 2 includes an upper section 4, which is angular in cross-section, for example, triangular, as shown. This upper section 4 fits on to a tubular extension 5, which rises from the lower portion of the spindle 6. A sleeve 7 surrounds the lower portion of the spindle 6 and is freely rotatable thereon so that this sleeve may rotate with the records on the turntable 1. The lower portion 6 of the spindle may also be angular to conform in shape to the upper portion 4. However, the lower portion of this section 6 is circular in cross-section so that the sleeve 7 may rotate thereon, if necessary.

Figure 1:
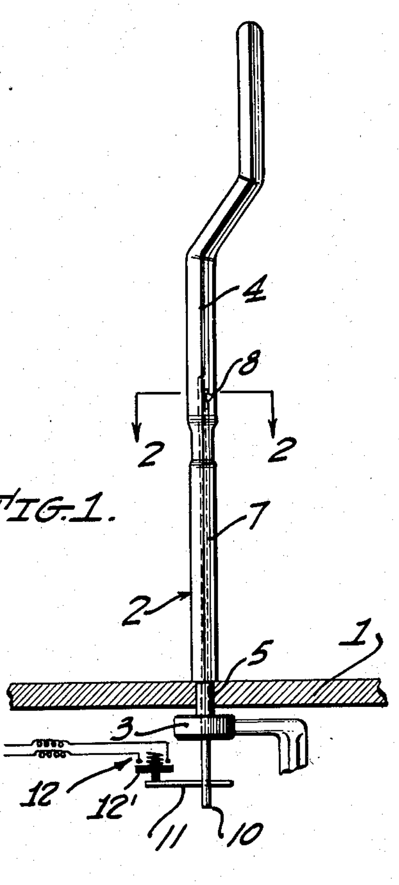
Figure 1 is a side elevation of a record player spindle embodying my construction.
Figure 3:
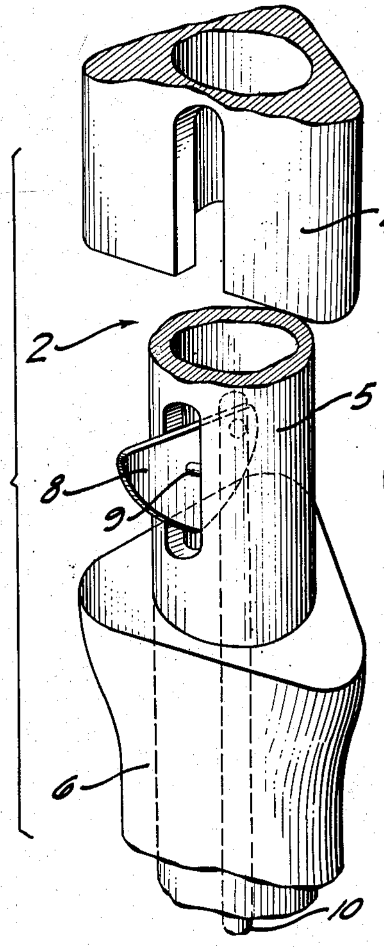
Figure 3 is a fragmentary perspective and exploded view of the trip portion of the spindle.
Figure 4:
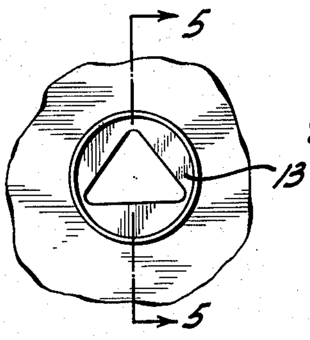
Figure 4 is a plan view of a grommet, which may be inserted in a record.
Figure 5:
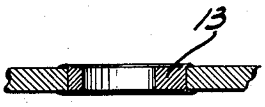
Figure 5 is a sectional view taken on line 5—5 of Figure 4.

A trigger 8 is pivotly mounted in the upper tubular portion 5 on the pin 9. The inner end of the trigger 8 is pivotly attached to a rod 10, which extends downwardly through the spindle and particularly through the tubular portion 5 thereof. This rod 10 has a finger 11 secured to its lower end or suitably mounted thereon and the finger actuates a micro-switch 12 and this micro-switch, in turn, is suitably electrically connected to a relay which is connected to a motor and the motor in turn, drives the turntable 1. By controlling the driving motor or actuating a gear box the turntable will be driven at the speed required. The trigger 8 projects from the outer surface of the spindle in the flat side area thereof. Thus, when a record, which has a central opening, as indicated by the grommet 13, is placed on the spindle 2, the grommet will engage the trigger 8 causing it to swing on its pivot 9 and thus moving the rod 10 and actuating the micro-switch 12. As here shown, the micro-switch 12 is actuated by mechanical contact. In Figure 1 the two extending arms 12′ are a diagrammatic showing of a micro-switch.

When another record having a circular opening, generally indicated at 14, is inserted on the spindle 4, it will by-pass the trigger 8, as shown in Figure 2, and consequently the trigger will not close the micro-switch 12 and a different speed of the turntable 1 will result, this speed conforming to the requirements of the record having a circular opening, as indicated by 14.

The angular shaped portion 4 of the spindle 2 is inscribed in the circle 14, consequently, the record will still have sufficient bearing to hold it in a central position on the turntable. When the record has a triangular (or other shape) hole in the center, the trigger 8 will be engaged thereby to actuate the micro-switch 12 as the record is placed on the spindle 2 and drops downwardly on to the turntable 1. When the grommet 13 engages the trigger 8, this trigger will be depressed and will actuate the precision switch 12. Closing of the switch 12 (even momentarily) will actuate a relay (not shown) which controls the phonograph motor (not shown) and the motor thus started through the relay on closing of the switch 12 will continue to operate until the phonograph is turned off after the record has been played. Only momentary closing of the switch 12 is necessary and therefore the trigger 8 can return to its normal extended position.

Having described my invention, I claim:

A spindle mounted speed control unit for record players, comprising a turntable, a spindle rising from said turntable, said spindle including an upper portion, angular in cross-section, and a lower sleeve journaled on said spindle, a trip finger pivotally mounted in the upper portion of the spindle and projecting from a flat face of the spindle, a rod depending from the finger and extending downwardly through the spindle, switch means engageable by said rod, a record, said record having a central opening conforming to the cross-sectional shape of the spindle.

CLAGGETT OFFUTT.

REFERENCES CITED

The following references are of record in the file of this patent:

UNITED STATES PATENTS

| Number | Name | Date |
| --- | --- | --- |
| 2,113,401 | Goldsmith | Apr. 5, 1938 |